United States Patent
Wang et al.

(10) Patent No.: US 10,018,789 B2
(45) Date of Patent: Jul. 10, 2018

(54) METHOD AND APPARATUS FOR COUPLING OPTICAL WAVEGUIDE TO SINGLE-MODE FIBER

(71) Applicant: Huawei Technologies Co., Ltd., Shenzhen (CN)

(72) Inventors: Pan Wang, Shenzhen (CN); Can Zhang, Shenzhen (CN); Qinfen Hao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/187,613

(22) Filed: Jun. 20, 2016

(65) Prior Publication Data
US 2016/0299294 A1  Oct. 13, 2016

Related U.S. Application Data

(63) Continuation of application No. PCT/CN2013/090123, filed on Dec. 20, 2013.

(51) Int. Cl.
*G02B 6/30* (2006.01)
*G02B 6/122* (2006.01)
(Continued)

(52) U.S. Cl.
CPC .......... *G02B 6/305* (2013.01); *G02B 6/1221* (2013.01); *G02B 6/132* (2013.01); *G02B 6/138* (2013.01)

(58) Field of Classification Search
CPC ........ G02B 6/30; G02B 6/305; G02B 6/1221; G02B 6/132; G02B 6/138; G02B 6/14; G02B 6/24
See application file for complete search history.

(56) References Cited

U.S. PATENT DOCUMENTS 4,474,429 A * 10/1984 Yoldas ................. G02B 6/245
385/43
7,664,352 B1   2/2010 Okayama
(Continued)

FOREIGN PATENT DOCUMENTS

CN      1115857 A      1/1996
CN    201133993 Y     10/2008
(Continued)

OTHER PUBLICATIONS

Machine Translation and Abstract of Chinese Publication No. CN101533128, dated Sep. 16, 2009, 4 pages.
(Continued)

*Primary Examiner* — John M Bedtelyon
(74) *Attorney, Agent, or Firm* — Conley Rose, P.C.

(57) ABSTRACT

A method and an apparatus for coupling an optical waveguide to a single-mode fiber are disclosed. The apparatus includes a substrate, a first optical waveguide, a single-mode fiber and a second optical waveguide. The first optical waveguide, the single-mode fiber and the second optical waveguide dispose on the substrate. One end of the single-mode fiber has an optical fiber taper structure. One end of the second optical waveguide is optically coupled to the first optical waveguide. Another end of the second optical waveguide is optically coupled to the single-mode fiber using the optical fiber taper structure of the single-mode fiber.

17 Claims, 6 Drawing Sheets

(51) Int. Cl.
*G02B 6/132* (2006.01)
*G02B 6/138* (2006.01)

(56) References Cited

U.S. PATENT DOCUMENTS

| | | | | |
|---|---|---|---|---|
| 8,903,205 | B2* | 12/2014 | Koos | G02B 6/30 385/14 |
| 2003/0035614 | A1 | 2/2003 | Glebov et al. | |
| 2009/0087144 | A1 | 4/2009 | Yoshida | |
| 2010/0284699 | A1 | 11/2010 | Deliwala | |
| 2011/0116741 | A1 | 5/2011 | Cevini et al. | |
| 2011/0133063 | A1 | 6/2011 | Ji et al. | |
| 2012/0224820 | A1 | 9/2012 | Onishi | |
| 2015/0277054 | A1* | 10/2015 | Park | G02B 6/305 385/14 |

FOREIGN PATENT DOCUMENTS

| | | | |
|---|---|---|---|
| CN | 101359071 | A | 2/2009 |
| CN | 101533128 | A | 9/2009 |
| CN | 101641622 | A | 2/2010 |
| CN | 102116901 | A | 7/2011 |
| CN | 102141650 | A | 8/2011 |
| CN | 102540349 | A | 7/2012 |
| CN | 102713706 | A | 10/2012 |
| CN | 102866461 | A | 1/2013 |
| JP | 5655086 | A | 5/1981 |
| JP | H05249331 | A | 9/1993 |
| JP | H05079505 | U | 10/1993 |
| JP | H09159865 | A | 6/1997 |
| JP | 2004004756 | A | 1/2004 |
| JP | 2009036873 | A | 2/2009 |
| JP | 2009300688 | A | 12/2009 |
| JP | 2011513773 | A | 4/2011 |
| JP | 201364852 | A | 4/2013 |
| WO | 03044580 | A2 | 5/2003 |
| WO | 2010033435 | A2 | 3/2010 |

OTHER PUBLICATIONS

Machine Translation and Abstract of Chinese Publication No. CN102540349, dated Jul. 4, 2012, 5 pages.
Machine Translation and Abstract of Chinese Publication No. CN102866461, dated Jan. 9, 2013, 6 pages.
Machine Translation and Abstract of Chinese Publication No. CN201133993, dated Oct. 15, 2008, 2 pages.
Machine Translation and Abstract of Japanese Publication No. JP2013064852, dated Apr. 11, 2013, 11 pages.
Machine Translation and Abstract of Chinese Publication No. CN101533128, Part 1, dated Sep. 16, 2009, 4 pages.
Machine Translation and Abstract of Chinese Publication No. CN101533128, Part 2, dated Sep. 16, 2009, 3 pages.
Shoji, T., et al., "Low loss mode size converter from 0.3um square Si wire waveguides to singlemode fibres," XP006019474, Electronics Letters, vol. 38, No. 25, Dec. 5, 2002, 2 pages.
Leinse, A., et al., "Low loss fiber to chip connection system for telecommunication devices," XP002768263, Publications of the University of Twente, Jan. 2001, 6 pages.
Foreign Communication From a Counterpart Application, European Application No. 13899434.8, Partial Supplementary European Search Report dated Nov. 17, 2016, 10 pages.
Foreign Communication From a Counterpart Application, European Application No. 13899434.8, Extended European Search Report dated Mar. 27, 2017, 14 pages.
Foreign Communication From a Counterpart Application, PCT Application No. PCT/CN2013/090123, English Translation of International Search Report dated Sep. 29, 2014, 2 pages.
Foreign Communication From a Counterpart Application, PCT Application No. PCT/CN2013/090123, English Translation of Written Opinion dated Sep. 29, 2014, 13 pages.
Machine Translation and Abstract of Japanese Publication No. JP2009300688, dated Dec. 24, 2009, 24 pages.
Machine Translation and Abstract of Japanese Publication No. JPH05079505, dated Oct. 29, 1993, 5 pages.
Machine Translation and Abstract of Japanese Publication No. JPH05249331, dated Sep. 28, 1993, 62 pages.
Machine Translation and Abstract of Japanese Publication No. JPH09159865, dated Jun. 20, 1997, 15 pages.
Foreign Communication From a Counterpart Application, Japanese Application No. 2016-541230, Japanese Office Action dated Aug. 1, 2017, 4 pages.
Foreign Communication From a Counterpart Application, Japanese Application No. 2016-541230, English Translation of Japanese Office Action dated Aug. 1, 2017, 4 pages.
Foreign Communication From a Counterpart Application, Chinese Application No. 201380076265.3, Chinese Search Report dated Dec. 7, 2017, 2 pages.
Foreign Communication From a Counterpart Application, Chinese Application No. 201380076265.3, Chinese Office Action dated Dec. 15, 2017, 5 pages.
Foreign Communication From a Counterpart Application, Japanese Application No. 2016-541230, Japanese Notice of Allowance dated Mar. 27, 2018, 3 pages.

* cited by examiner

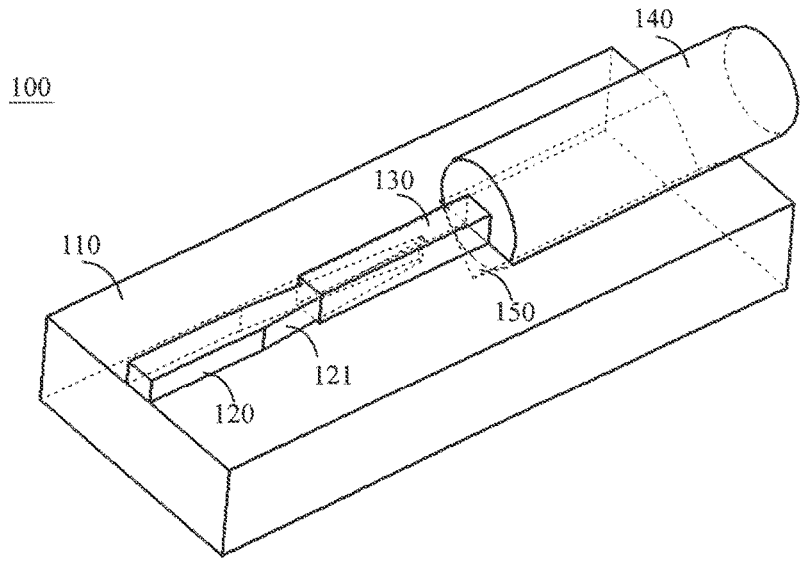

Form a locating slot on a substrate, where a first optical waveguide is further disposed on the substrate, one end of the first optical waveguide has an inverted taper structure whose width is gradually decreased, and a center line, passing through a taper tip, of the inverted taper structure is parallel to a center line of the locating slot  — 210

Horizontally fasten, into the locating slot, a single-mode fiber with one end having an optical fiber taper structure whose diameter is gradually decreased, where the end, having the optical fiber taper structure, of the single-mode fiber is disposed opposite to the end, having the inverted taper structure, of the first optical waveguide  — 220

Dispose a second optical waveguide on the substrate, so that the second optical waveguide is located between the first optical waveguide and the single-mode fiber, the second optical waveguide is optically coupled to the first optical waveguide by using the end, having the inverted taper structure, of the first optical waveguide, and the second optical waveguide is optically coupled to the single-mode fiber by using the end, having the optical fiber taper structure, of the single-mode fiber  — 230

FIG. 2

METHOD AND APPARATUS FOR COUPLING OPTICAL WAVEGUIDE TO SINGLE-MODE FIBER

CROSS-REFERENCE TO RELATED APPLICATION

This application is a continuation of International Application No. PCT/CN2013/090123, filed on Dec. 20, 2013, which is hereby incorporated by reference in its entirety.

TECHNICAL FIELD

Embodiments of the present disclosure relate to the communications field, and in particular, to a method and an apparatus for coupling an optical waveguide to a single-mode fiber.

BACKGROUND

With the development of high-speed information technologies, integrated optical devices are gradually replacing traditional micro-optical devices, and become core structural units in fields such as optical communications, optical computing, and optical sensing in future. Using a silicon waveguide as an example, due to a high difference between refractive indexes of core layer silicon and cladding silica, a silicon waveguide based on a silicon on insulator (SOI) material has an extremely strong binding effect on transmission of a light field, and the silicon waveguide has a very small section size under a single-mode condition, thereby implementing a miniaturized photonic device with high integration density. In addition, an SOI manufacturing process has advantages of being compatible with a traditional complementary metal-oxide-semiconductor (CMOS) process and being able to implement integration between a photonic device and an electronic device. Therefore, the SOI material has become a main material for preparing an integrated optical waveguide device and has a wide application prospect.

For an integrated optical waveguide device, a critical issue is that when an optical signal is input and output to implement communication between the device and an off-chip optical system, especially when current luminous efficiency of silicon does not meet a practical requirement, an optical fiber needs to be used to introduce a light source from the outside of an optical waveguide. However, the integrated optical waveguide has a strong binding capability for a light field, and during single-mode transmission, a spot size of the integrated optical waveguide is approximately on an order of hundreds of nanometers and a mode field shape of the integrated optical waveguide is generally an ellipse, while a common single-mode fiber has a weaker binding capability for the light field, and during single-mode transmission, a spot size of the common single-mode fiber is generally about 10 micrometer (μm) and a mode field shape of the common single-mode fiber is a circle. In this case, when the integrated optical waveguide is directly coupled to the single-mode fiber, there is a huge difference between the spot sizes of the integrated optical waveguide and the single-mode fiber, and the mode field shapes of the integrated optical waveguide and the single-mode fiber are seriously mismatched. In addition, a difference between refractive indexes of interfaces of the integrated optical waveguide and the single-mode fiber during coupling also causes an extra Fresnel reflection loss. As a result, when the integrated optical waveguide is directly coupled to the single-mode fiber, efficiency is very low and generally does not exceed 10%, which cannot meet a commercial requirement obviously. Therefore, development of a simple and effective method for input-output coupling between an integrated optical waveguide and a single-mode fiber that has high coupling efficiency, a low device requirement, and low package costs has great practical significance to practicability of an integrated optical waveguide device.

An inverted taper-based spot-size converter method is a commonly-used transverse coupling method. As shown in FIG. 1, a principle of the coupling method 100 includes using an inverted taper structure 121 whose width is gradually decreased and that is disposed at an end of a silicon waveguide 120 to enlarge a small-size spot of the silicon waveguide 120, and disposing, at the inverted taper structure 121 of the silicon waveguide 120, a low refractive index optical waveguide 130 wrapping the inverted taper structure 121 such that a mode field in the silicon waveguide 120 gradually separates from the silicon waveguide 120 and is transferred into the low refractive index optical waveguide 130, thereby enlarging a size of a mode field that transmits light to enable the size to be close to a size of a mode field of a single-mode fiber, and then forming a locating slot (for example, V-shaped slot) 150 at one side, opposite to the silicon waveguide 120, on an upper surface of a substrate 110, and fastening a cylindrical single-mode fiber 140 in the locating slot 150 such that a surface of one end of the single-mode fiber 140 is in contact with a surface of one end of the low refractive index optical waveguide 130, and a center line of the single-mode fiber 140 is perfectly aligned with a center line of the low refractive index optical waveguide 130.

The inverted taper-based spot-size converter method has relatively high coupling efficiency and a broadband coupling feature, and the coupling efficiency is insensitive to polarization that is for transmitting light. However, the coupling method has the following disadvantages. First, because a mode field diameter of the silicon waveguide that is enlarged using the inverted taper structure is still relatively small (about 3 μm), the single-mode fiber still needs to be perfectly aligned with the low refractive index optical waveguide. For example, if the single-mode fiber uses a lensed fiber whose terminal diameter is 3 μm, 1 decibel (dB) alignment tolerance between the single-mode fiber and the low refractive index optical waveguide is about ±0.3 μm. Therefore, it can be seen that the coupling method has a very high precision requirement on a packaging device. Second, due to the high alignment precision requirement of the coupling method, the coupling method usually requires active coupling to ensure coupling efficiency, which increases coupling complexity. Third, to improve the coupling efficiency, polishing processing generally needs to be performed on an end face of the low refractive index optical waveguide, and an anti-reflection film needs to be coated on the end face of the low refractive index optical waveguide, or refractive index matching liquids are added between the end face of the low refractive index optical waveguide and a terminal of the single-mode fiber to reduce Fresnel reflection on the end face. Fourth, because the coupling method requires very high alignment precision, the method is relatively difficult to implement coupling between an optical waveguide and a fiber array and is not applicable to coupling and packaging for an optical chip having high-density input and output interfaces. In summary, it is a problem that urgently needs to be resolved in the art as how to reduce a requirement on alignment precision on the basis of ensuring coupling efficiency between an optical waveguide and a single-mode fiber in order to lower a requirement of coupling on a device, reduce packaging costs, and implement coupling between an optical waveguide array and a single-mode fiber array.

SUMMARY

The present disclosure provides a method for coupling an optical waveguide to a single-mode fiber and an apparatus for coupling an optical waveguide to a single-mode fiber, which can lower an alignment precision requirement on a coupling device and reduce production costs.

According to a first aspect, a method for coupling an optical waveguide to a single-mode fiber is provided, including forming a locating slot on a substrate, where a first optical waveguide is further disposed on the substrate, one end of the first optical waveguide has an inverted taper structure whose width is gradually decreased, and a center line, passing through a taper tip, of the inverted taper structure is parallel to a center line of the locating slot, fastening, into the locating slot, a single-mode fiber with one end having an optical fiber taper structure whose diameter is gradually decreased, where the end, having the optical fiber taper structure, of the single-mode fiber is disposed opposite to the end, having the inverted taper structure, of the first optical waveguide, and disposing a second optical waveguide on the substrate according to a location of the first optical waveguide and a location of the single-mode fiber such that the second optical waveguide is located between the first optical waveguide and the single-mode fiber, the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber.

With reference to the first aspect, in a first possible implementation manner, disposing a second optical waveguide on the substrate according to a location of the first optical waveguide and a location of the single-mode fiber such that the second optical waveguide is located between the first optical waveguide and the single-mode fiber, the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber includes disposing the second optical waveguide on the substrate according to the location of the first optical waveguide and the location of the single-mode fiber such that the end, having the inverted taper structure, of the first optical waveguide and the end, having the optical fiber taper structure, of the single-mode fiber are both embedded in the second optical waveguide.

With reference to the first aspect, in a second possible implementation manner, disposing a second optical waveguide on the substrate according to a location of the first optical waveguide and a location of the single-mode fiber such that the second optical waveguide is located between the first optical waveguide and the single-mode fiber, the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber includes disposing the second optical waveguide on the substrate according to the location of the first optical waveguide and the location of the single-mode fiber such that the end, having the inverted taper structure, of the first optical waveguide is embedded in the second optical waveguide, and the end, having the optical fiber taper structure, of the single-mode fiber is optically coupled to the second optical waveguide using an evanescent field.

With reference to the first aspect or with reference to the first or second possible implementation manner of the first aspect, in a third possible implementation manner, disposing a second optical waveguide on the substrate according to a location of the first optical waveguide and a location of the single-mode fiber includes determining a location of a terminal of the end, having the optical fiber taper structure, of the single-mode fiber and a location of a terminal of the end, having the inverted taper structure, of the first optical waveguide, determining a path of the second optical waveguide on the substrate according to the location of the terminal of the end, having the optical fiber taper structure, of the single-mode fiber and the location of the terminal of the end, having the inverted taper structure, of the first optical waveguide, and disposing the second optical waveguide on the substrate according to the path of the second optical waveguide on the substrate.

With reference to the third possible implementation manner of the first aspect, in a fourth possible implementation manner, determining a path of the second optical waveguide on the substrate according to the location of the terminal of the end, having the optical fiber taper structure, of the single-mode fiber and the location of the terminal of the end, having the inverted taper structure, of the first optical waveguide includes determining a path with a smallest loss among all possible paths determined according to the location of the terminal of the end, having the optical fiber taper structure, of the single-mode fiber and the location of the terminal of the end, having the inverted taper structure, of the first optical waveguide, and using the path with a smallest loss as the path of the second optical waveguide on the substrate.

With reference to the third or fourth possible implementation manner of the first aspect, in a fifth possible implementation manner, disposing the second optical waveguide on the substrate according to the path of the second optical waveguide on the substrate includes spin-coating a layer of ultraviolet-sensitive polymer material on the substrate, and performing direct writing on the ultraviolet-sensitive polymer material along the path of the second optical waveguide on the substrate using an ultraviolet laser in order to form the second optical waveguide.

With reference to the first aspect or with reference to any possible implementation manner of the first to fifth possible implementation manners of the first aspect, in a sixth possible implementation manner, the locating slot is a U-shaped slot, a V-shaped slot, or a rectangular slot.

With reference to the first aspect or with reference to any possible implementation manner of the first to sixth possible implementation manners of the first aspect, in a seventh possible implementation manner, forming a locating slot on a substrate includes setting a section size of the locating slot such that when the single-mode fiber is horizontally fastened into the locating slot, the terminal of the end, having the optical fiber taper structure, of the single-mode fiber is higher than an upper surface of the substrate.

With reference to the first aspect or with reference to any possible implementation manner of the first to seventh possible implementation manners of the first aspect, in an eighth possible implementation manner, a diameter of a taper tip of the optical fiber taper structure is less than 3 µm.

With reference to the first aspect or with reference to any possible implementation manner of the first to eighth possible implementation manners of the first aspect, in a ninth possible implementation manner, a width of the taper tip of the inverted taper structure is less than 100 nanometer (nm), and a length of a taper area of the inverted taper structure has an order of hundreds of micrometers.

According to a second aspect, an apparatus for coupling an optical waveguide to a single-mode fiber is provided, including at least one optical waveguide-fiber coupling unit, where a first optical waveguide-fiber coupling unit of the at least one optical waveguide-fiber coupling unit includes a substrate, where a locating slot is formed on the substrate, a first optical waveguide disposed on the substrate, where one end of the first optical waveguide has an inverted taper structure whose width is gradually decreased, and a center line, passing through a taper tip, of the inverted taper structure is parallel to a center line of the locating slot, a single-mode fiber disposed in the locating slot, where one end of the single-mode fiber has an optical fiber taper structure whose diameter is gradually decreased, and the end, having the optical fiber taper structure, of the single-mode fiber is disposed opposite to the end, having the inverted taper structure, of the first optical waveguide, and a second optical waveguide disposed on the substrate, where the second optical waveguide is located between the first optical waveguide and the single-mode fiber, the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber.

With reference to the second aspect, in a first possible implementation manner, that the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber includes the end, having the inverted taper structure, of the first optical waveguide and the end, having the optical fiber taper structure, of the single-mode fiber are both embedded in the second optical waveguide.

With reference to the second aspect, in a second possible implementation manner, that the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber includes the end, having the inverted taper structure, of the first optical waveguide is embedded in the second optical waveguide, and the end, having the optical fiber taper structure, of the single-mode fiber is optically coupled to the second optical waveguide using an evanescent field.

With reference to the second aspect or with reference to the first or second possible implementation manner of the second aspect, in a third possible implementation manner, a path of the second optical waveguide on the substrate is a path with a smallest loss among all possible paths determined according to a location of a terminal of the end, having the inverted taper structure, of the first optical waveguide and a location of a terminal of the end, having the optical fiber taper structure, of the single-mode fiber.

With reference to the third possible implementation manner of the second aspect, in a fourth possible implementation manner, the second optical waveguide is obtained by performing direct writing, along the path with a smallest loss using an ultraviolet laser, on an ultraviolet-sensitive polymer material spin-coated on the substrate.

With reference to the second aspect or with reference to any possible implementation manner of the first to fourth possible implementation manners of the second aspect, in a fifth possible implementation manner, the locating slot is a U-shaped slot, a V-shaped slot, or a rectangular slot.

With reference to the second aspect or with reference to any possible implementation manner of the first to fifth possible implementation manners of the second aspect, in a sixth possible implementation manner, by means of setting a section size of the locating slot is set, the terminal of the end, having the optical fiber taper structure, of the single-mode fiber is higher than an upper surface of the substrate.

With reference to the second aspect or with reference to any possible implementation manner of the first to sixth possible implementation manners of the second aspect, in a seventh possible implementation manner, a diameter of a taper tip of the optical fiber taper structure is less than 3 μm.

With reference to the second aspect or with reference to any possible implementation manner of the first to seventh possible implementation manners of the second aspect, in an eighth possible implementation manner, a width of the taper tip of the inverted taper structure is less than 100 nm, and a length of a taper area of the inverted taper structure has an order of hundreds of micrometers.

Based on the foregoing technical solutions, according to the method for coupling an optical waveguide to a single-mode fiber and the apparatus for coupling an optical waveguide to a single-mode fiber that are provided by the embodiments of the present disclosure, one end of a first optical waveguide is set to have an inverted taper structure, to enlarge a spot size of the first optical waveguide, one end of a single-mode fiber is set to have an optical fiber taper structure, to diminish a spot size of the single-mode fiber, and a second optical waveguide is disposed according to locations of the first optical waveguide and the single-mode fiber in order to implement alignment and coupling between the first optical waveguide and the single-mode fiber using the second optical waveguide. The first optical waveguide and the single-mode fiber do not need to be precisely aligned, as long as center lines of the first optical waveguide and the single-mode fiber are parallel, thereby improving an alignment tolerance between the first optical waveguide and the single-mode fiber, lowering an alignment precision requirement on a coupling device and reducing production costs, and increasing a possibility of industrializing an integrated optical waveguide chip.

BRIEF DESCRIPTION OF DRAWINGS

To describe the technical solutions in the embodiments of the present disclosure more clearly, the following briefly introduces the accompanying drawings required for describing the embodiments of the present disclosure or the prior art. The accompanying drawings in the following description show merely some embodiments of the present disclosure.

FIG. 1 is a schematic three-dimensional view of coupling a single-mode fiber to an optical waveguide using an existing inverted taper-based spot-size converter method;

FIG. 2 is a schematic flowchart of a method for coupling an optical waveguide to a single-mode fiber according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure.

FIG. 2 is a schematic flowchart of a method for coupling an optical waveguide to a single-mode fiber according to an embodiment of the present disclosure. The method may be executed by an apparatus for coupling an optical waveguide to a single-mode fiber. As shown in FIG. 2, the method includes the following steps.

Step 210: Form a locating slot on a substrate, where a first optical waveguide is further disposed on the substrate, one end of the first optical waveguide has an inverted taper structure whose width is gradually decreased, and a center line, passing through a taper tip, of the inverted taper structure is parallel to a center line of the locating slot.

The first optical waveguide is any integrated optical waveguide. Further, the first optical waveguide may be a silicon waveguide, that is, a silicon-based optical waveguide, and correspondingly, the substrate may be an SOI substrate. The first optical waveguide may also be a polymer optical waveguide, for example, an optical waveguide in an opto-electric hybrid printed circuit board (OE-PCB), but this embodiment of the present disclosure is not limited thereto.

The first optical waveguide is disposed at one side on an upper surface of the substrate, and one end of the first optical waveguide is processed to have the inverted taper structure, where the width of the inverted taper structure is gradually decreased along a direction of the locating slot such that a size of a mode field that is transmitted in the first optical waveguide is gradually enlarged and a light field that is limited to being transmitted in the first optical waveguide gradually separates from the first optical waveguide and is transferred to the outside of the first optical waveguide. Optionally, the inverted taper structure may be processed using a photolithography process, an electron-beam lithography process, or the like, which is not limited in this embodiment of the present disclosure. Optionally, to effectively enlarge a spot size of the first optical waveguide, a width of the taper tip of the inverted taper structure is less than 100 nm, and a length of a taper area of the inverted taper structure has an order of hundreds of micrometers.

A slope of the inverted taper structure may be set according to an actual requirement. Generally, a smaller slope indicates a larger length of the inverted taper structure. Preferably, the inverted taper structure can meet an adiabatic transition condition such that the first optical waveguide has a smallest structural loss, but this embodiment of the present disclosure is not limited thereto.

Figure 3:
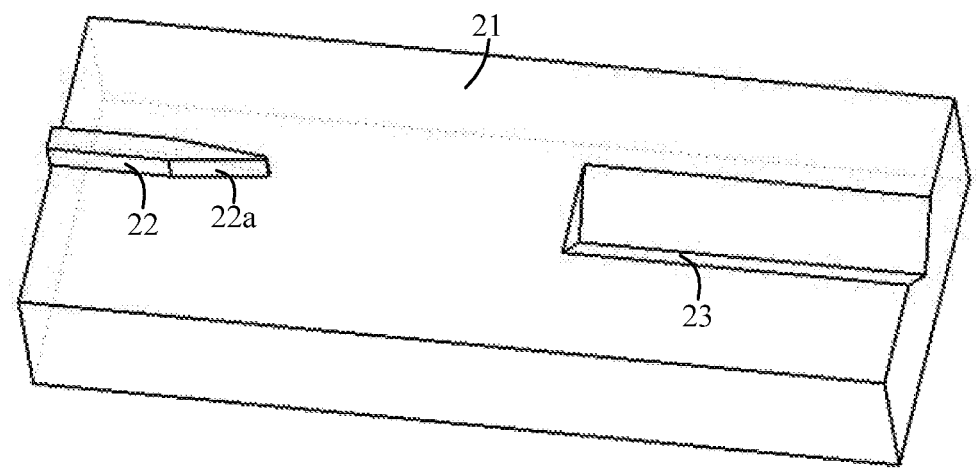
FIG. 3 is a schematic three-dimensional view of coupling an optical waveguide to a single-mode fiber using a method for coupling an optical waveguide to a single-mode fiber according to an embodiment of the present disclosure.

The locating slot may be generated using any anisotropic etching method. As shown in FIG. 3, an apparatus 200 for coupling an optical waveguide to a single-mode fiber, a locating slot 23 may be formed on one side, opposite to a first optical waveguide 22, on the upper surface of a substrate 21, and the center line of the locating slot 23 is parallel to the center line, passing through the taper tip, of an inverted taper structure 22a of the first optical waveguide 22, where a transverse distance between the taper tip of the inverted taper structure 22a and the center line of the locating slot 23 may be less than a preset threshold (100 μm), and the preset threshold may depend on processing precision of the locating slot 23 and layouts of coupling units of the apparatus for coupling an optical waveguide to a single-mode fiber. Preferably, the taper tip of the inverted taper structure 22a may be basically aligned with the center line of the locating slot 23, that is, the center line, passing through the taper tip, of the inverted taper structure 22a basically coincides with the center line of the locating slot 23. In this way, the first optical waveguide 22 is basically aligned with a single-mode fiber that is subsequently fastened into the locating slot 23, but this embodiment of the present disclosure is not limited thereto.

Step 220: Horizontally fasten, into the locating slot, a single-mode fiber with one end having an optical fiber taper structure whose diameter is gradually decreased, where the end, having the optical fiber taper structure, of the single-mode fiber is disposed opposite to the end, having the inverted taper structure, of the first optical waveguide.

One end of the single-mode fiber is processed to have the optical fiber taper structure, where the diameter of the optical fiber taper structure is gradually decreased along a direction of the first optical waveguide such that a spot size of the single-mode fiber is decreased. Generally, the spot size of the single-mode fiber may be decreased from 10 μm to an order of a submicrometer using the optical fiber taper structure. Optionally, a diameter of a taper tip of the optical fiber taper structure of the single-mode fiber may be less than 3 μm, and the optical fiber taper structure may be prepared using a heating method, a chemical etching method, or the like, where the heating method may be flame heating, laser heating, electric heating, or the like, and this embodiment of the present disclosure is not limited thereto.

Figure 4:
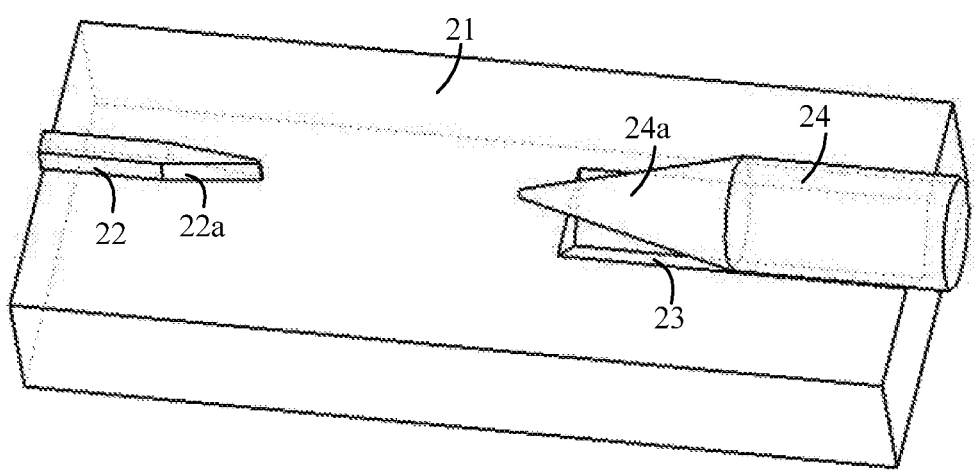
FIG. 4 is another schematic three-dimensional view of coupling an optical waveguide to a single-mode fiber using a method for coupling an optical waveguide to a single-mode fiber according to an embodiment of the present disclosure.

Optionally, the single-mode fiber may be horizontally fastened and packaged in the locating slot using an ultraviolet curing adhesive, and the end, having the optical fiber taper structure, of the single-mode fiber may extend out of the locating slot along the direction of the first optical waveguide. As shown in FIG. 4, an apparatus 200 for coupling an optical waveguide to a single-mode fiber, when the single-mode fiber 24 is fastened, the end, having the optical fiber taper structure 24a, of the single-mode fiber 24 may extend out of the locating slot 23 by an appropriate length, and the extended length may be dozens of micrometers. In addition, a line in which a terminal of the end, having the optical fiber taper structure 24a, of the single-mode fiber 24 is located may be parallel to a line in which a terminal of the end, having the inverted taper structure 22a, of the first optical waveguide 22 is located. Preferably, the terminal of the single-mode fiber 24 may be basically aligned with the terminal of the first optical waveguide 22, but this embodiment of the present disclosure is not limited thereto.

Step 230: Dispose a second optical waveguide on the substrate according to a location of the first optical waveguide and a location of the single-mode fiber, so that the second optical waveguide is located between the first optical waveguide and the single-mode fiber, the second optical waveguide is optically coupled to the first optical waveguide by using the end, having the inverted taper structure, of the first optical waveguide, and the second optical waveguide is optically coupled to the single-mode fiber by using the end, having the optical fiber taper structure, of the single-mode fiber.

Figure 5:
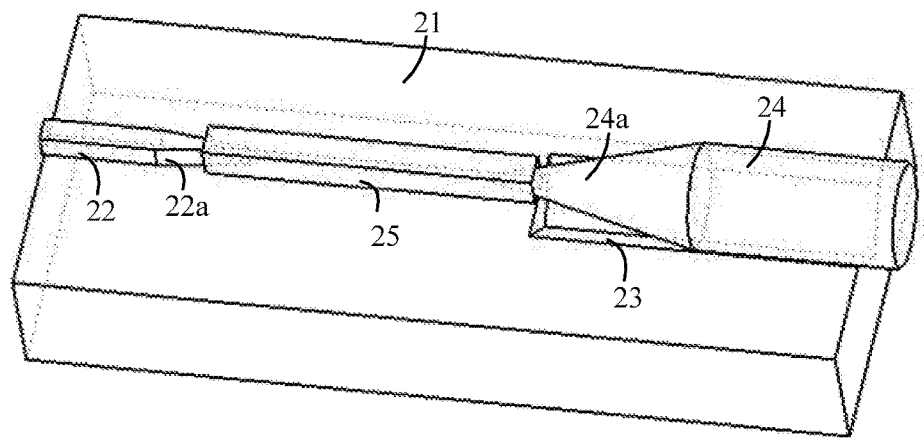
FIG. 5 is still another schematic three-dimensional view of coupling an optical waveguide to a single-mode fiber using a method for coupling an optical waveguide to a single-mode fiber according to an embodiment of the present disclosure.

As shown in FIG. 5, an apparatus 200 for coupling an optical waveguide to a single-mode fiber, the second optical waveguide 25 is located between the first optical waveguide 22 and the single-mode fiber 24, and the second optical waveguide 25 is optically coupled to the first optical waveguide 22 and the single-mode fiber 24 in order to implement optical coupling between the first optical waveguide 22 and the single-mode fiber 24. Optionally, a path of the second optical waveguide 25 on the substrate 21 may be set according to the location of the first optical waveguide 22, a location of the single-mode fiber 24, and a manner of optical coupling between the second optical waveguide 25 and the first optical waveguide 22 and a manner of optical coupling between the second optical waveguide 25 and the single-mode fiber 24. The second optical waveguide 25 may be optically coupled to the first optical waveguide 22 and the single-mode fiber 24 in various manners, which is not limited in this embodiment of the present disclosure.

Therefore, according to the method for coupling an optical waveguide to a single-mode fiber in this embodiment of the present disclosure, one end of a first optical waveguide is set to have an inverted taper structure, to enlarge a spot size of the first optical waveguide, one end of a single-mode fiber is set to have an optical fiber taper structure, to diminish a spot size of the single-mode fiber, and a second optical waveguide is disposed according to locations of the first optical waveguide and the single-mode fiber in order to implement alignment and coupling between the first optical waveguide and the single-mode fiber using the second optical waveguide. The first optical waveguide and the single-mode fiber do not need to be precisely aligned, as long as center lines of the first optical waveguide and the single-mode fiber are parallel, thereby improving an alignment tolerance between the first optical waveguide and the single-mode fiber, lowering an alignment precision requirement on a coupling device and reducing production costs, and increasing a possibility of industrializing an integrated optical waveguide chip.

In this embodiment of the present disclosure, coupling and alignment between the first optical waveguide and the single-mode fiber are implemented mainly using the second optical waveguide. Therefore, the locating slot may have multiple different shapes. Optionally, the locating slot may be a U-shaped slot, a V-shaped slot, or a rectangular slot. The locating slot shown in FIG. 3 to FIG. 5 is a V-shaped slot, but this embodiment of the present disclosure is not limited thereto.

Step 210 of forming a locating slot on a substrate includes the following step.

Step 211: Set a section size of the locating slot such that when the single-mode fiber is horizontally fastened into the locating slot, the terminal of the end, having the optical fiber taper structure, of the single-mode fiber is higher than an upper surface of the substrate.

Furthermore, as shown in FIG. 4 and FIG. 5, the section size of the locating slot 23 is set such that the terminal of the end, having the optical fiber taper structure 24a, of the single-mode fiber 24 is higher than the upper surface of the substrate 21, where a distance between the terminal and the upper surface may be 1 μm to 5 μm. Preferably, a height between the terminal of the end, having the optical fiber taper structure 24a, of the single-mode fiber 24 and the upper surface of the substrate 21 may be a half of a height of the second optical waveguide 25, but this embodiment of the present disclosure is not limited thereto.

Optionally, in another embodiment, step 230 of disposing a second optical waveguide on the substrate such that the second optical waveguide is located between the first optical waveguide and the single-mode fiber, the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber includes the following step.

Step 230a: Dispose the second optical waveguide on the substrate such that the end, having the inverted taper structure, of the first optical waveguide and the end, having the optical fiber taper structure, of the single-mode fiber are both embedded in the second optical waveguide.

Figure 6:
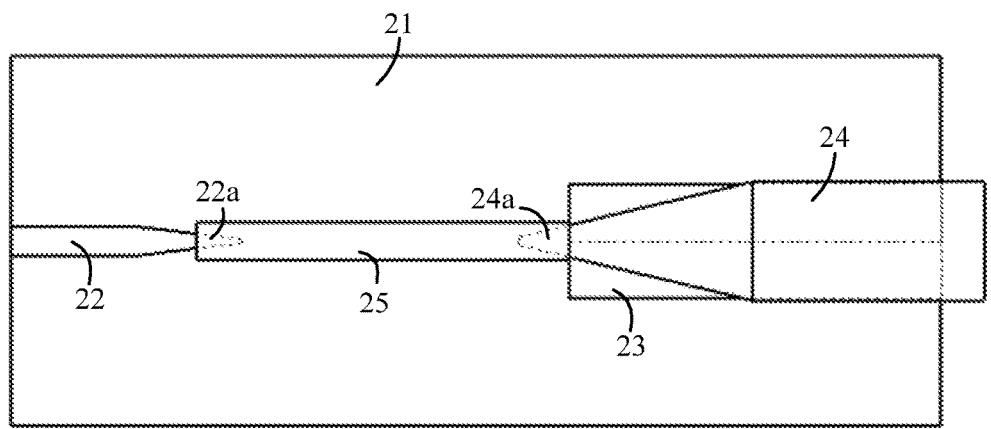
FIG. 6 is a top view of the schematic three-dimensional view shown in FIG. 5.

Furthermore, both the end, having the inverted taper structure, of the first optical waveguide and the end, having the optical fiber taper structure, of the single-mode fiber may be wrapped in the second optical waveguide. In this way, a partial structure of the first optical waveguide and a partial structure of the single-mode fiber are both located in the second optical waveguide, thereby implementing that the second optical waveguide is optically coupled to the first optical waveguide and the single-mode fiber. Optionally, as shown in FIG. 5 and FIG. 6, an apparatus 200 for coupling an optical waveguide to a single-mode fiber, both the end, having the inverted taper structure 22a, of the first optical waveguide 22 and the end, having the optical fiber taper structure 24a, of the single-mode fiber 24 may be embedded near a central axis of the second optical waveguide 25 in order to implement optical coupling between the second optical waveguide 25 the first optical waveguide 22 and between the second optical waveguide 25 and the single-mode fiber 24.

Optionally, in another embodiment, step 230 of disposing a second optical waveguide on the substrate such that the second optical waveguide is located between the first optical waveguide and the single-mode fiber, the second optical waveguide is optically coupled to the first optical waveguide using the end, having the inverted taper structure, of the first optical waveguide, and the second optical waveguide is optically coupled to the single-mode fiber using the end, having the optical fiber taper structure, of the single-mode fiber includes the following step.

Step 230b: Dispose the second optical waveguide on the substrate such that the end, having the inverted taper structure, of the first optical waveguide is embedded in the second optical waveguide, and the end, having the optical fiber taper structure, of the single-mode fiber is optically coupled to the second optical waveguide using an evanescent field.

Figure 7:
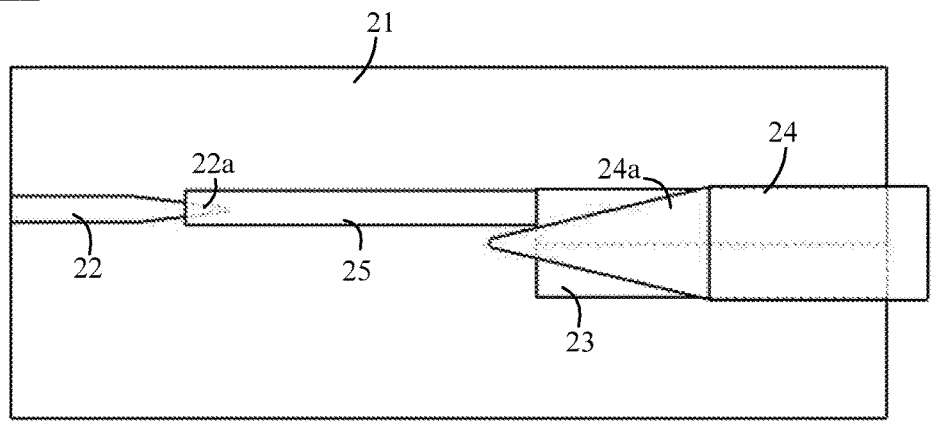
FIG. 7 is another top view of coupling an optical waveguide to a single-mode fiber using a method for coupling an optical waveguide to a single-mode fiber according to an embodiment of the present disclosure.

The evanescent field herein refers to an electromagnetic wave field that is generated through total reflection and transmitted on a surface of a waveguide and whose strength exponentially decays as a vertical depth increases. As shown in FIG. 7, an apparatus 200 for coupling an optical waveguide to a single-mode fiber, the end, having the optical fiber taper structure 24a, of the single-mode fiber 24 may be close to the second optical waveguide 25 within a particular distance, for example, within about 100 nm. Optionally, a side face of the terminal of the end, having the optical fiber taper structure 24a, of the single-mode fiber 24 may also be partially overlapped with the second optical waveguide 25, that is, a part of the end, having the optical fiber taper structure 24a, of the single-mode fiber 24 is embedded in the second optical waveguide 25, but this embodiment of the present disclosure is not limited thereto.

The path of the second optical waveguide on the substrate may be set by depending on the location of the first optical waveguide, the location of the single-mode fiber, and a manner of coupling between the second optical waveguide and the first optical waveguide and between the second optical waveguide and the single-mode fiber. Optionally, in another embodiment, disposing the second optical waveguide on the substrate in step 230 or step 230a or step 230b includes the following steps.

Step 231: Determine a location of the terminal of the end, having the optical fiber taper structure, of the single-mode fiber and a location of the terminal of the end, having the inverted taper structure, of the first optical waveguide.

Step 232: Determine a path of the second optical waveguide on the substrate according to the location of the terminal of the end, having the optical fiber taper structure, of the single-mode fiber and the location of the terminal of the end, having the inverted taper structure, of the first optical waveguide.

Step 233: Dispose the second optical waveguide on the substrate according to the path of the second optical waveguide on the substrate.

The location of the terminal of the end, having the optical fiber taper structure, of the single-mode fiber and the location of the terminal of the end, having the inverted taper structure, of the first optical waveguide may be determined by means of machine visual aids such that accurate locations of the terminals of the first optical waveguide and the single-mode fiber are determined more precisely, and the path of the second optical waveguide on the substrate may be determined according to a location of the taper tip of the inverted taper structure, a location of the taper tip of the optical fiber taper structure, and the manner of coupling between the second optical waveguide and the first optical waveguide and between the second optical waveguide and the single-mode fiber. Optionally, according to the path of the second optical waveguide, a part of the inverted taper structure may be embedded in the second optical waveguide and a part of the optical fiber taper structure be embedded in the second optical waveguide, or according to the path of the second optical waveguide, a part of the inverted taper structure may be embedded at one side of the second optical waveguide, and the other side of the second optical waveguide may be close to the optical fiber taper structure within a particular distance, but this embodiment of the present disclosure is not limited thereto.

Figure 8:
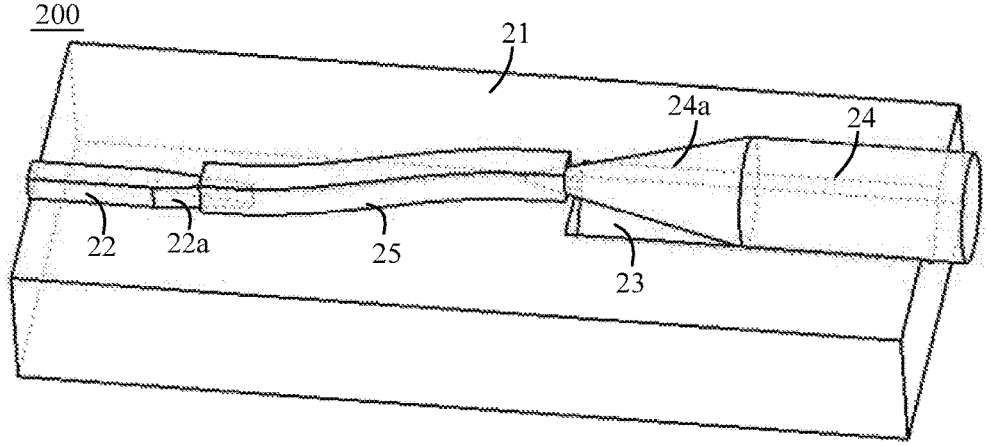
FIG. 8 is still another schematic three-dimensional view of coupling an optical waveguide to a single-mode fiber using a method for coupling an optical waveguide to a single-mode fiber according to an embodiment of the present disclosure.
Figure 9:
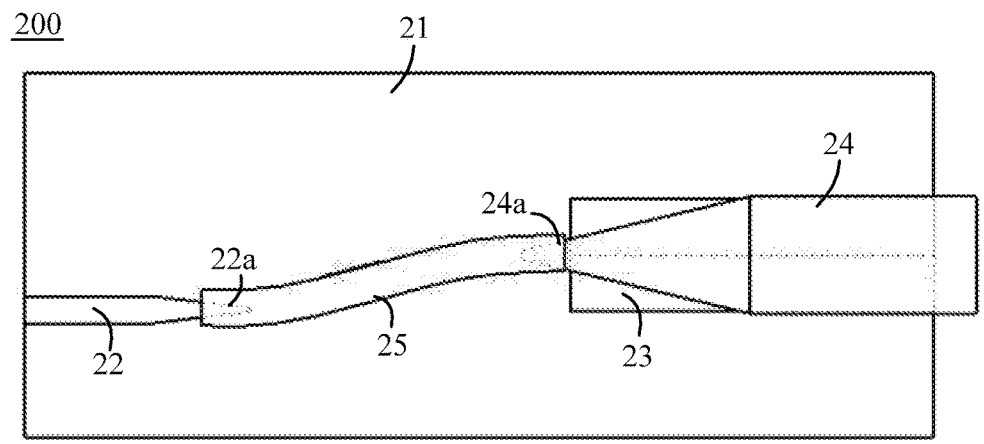
FIG. 9 is a top view of the schematic three-dimensional view shown in FIG. 8.

Optionally, in another embodiment, as shown in FIG. 8 and FIG. 9, an apparatus 200 for coupling an optical waveguide to a single-mode fiber, the transverse distance between the taper tip of the inverted taper structure and the center line of the locating slot may not be zero, and the path of the second optical waveguide on the substrate may be bent. In this case, the path of the second optical waveguide is also set by depending on a transmission loss of the second optical waveguide, and further, the path of the second optical waveguide on the substrate may also be a path with a relatively small transmission loss among all possible paths. Furthermore, the path of the second optical waveguide may be set to be slightly bent such that the second optical waveguide has a relatively small transmission loss, but this embodiment of the present disclosure is not limited thereto. Preferably, step 232 of determining a path of the second optical waveguide on the substrate according to the location of the terminal of the end, having the optical fiber taper structure, of the single-mode fiber and the location of the terminal of the end, having the inverted taper structure, of the first optical waveguide includes the following steps.

Step 2321: Determine a path with a smallest loss among all possible paths according to the location of the terminal of the end, having the optical fiber taper structure, of the single-mode fiber and the location of the terminal of the end, having the inverted taper structure, of the first optical waveguide.

Step 2322: Use the path with a smallest loss as the path of the second optical waveguide on the substrate.

The "loss" herein may refer to total losses of each path, where a total loss of a path may include a transmission loss and a bending loss. The transmission loss depends on a length of the path, and generally, a longer path indicates a larger transmission loss. The bending loss depends on a bending radius of a bending part of the path, and generally, a smaller bending radius indicates a larger bending loss. Therefore, generally, the path with a smallest loss may be a path of a small length and on which no obvious bending exists. Optionally, if all paths have no obvious bending, a path of a smallest length may serve as the path with a smallest loss, but this embodiment of the present disclosure is not limited thereto.

In this embodiment of the present disclosure, the second optical waveguide may be disposed on the foregoing determined path of the second optical waveguide in multiple manners. Optionally, step 233 of disposing the second optical waveguide on the substrate according to the path of the second optical waveguide on the substrate includes the following steps.

Step 2331: Spin-coat a layer of ultraviolet-sensitive polymer material on the substrate.

Step 2332: Perform direct writing on the ultraviolet-sensitive polymer material along the path of the second optical waveguide on the substrate using an ultraviolet laser in order to form the second optical waveguide.

The term "spin-coat" herein refers to a process in which a polymer solution is homogeneously coated on SOI by means of high-speed rotation of an SOI chip, while the term "direct writing" refers to implementing the second optical waveguide using a laser direct writing process, that is, manufacturing the second optical waveguide by controlling direct exposure of a motion path, of a laser beam focus, on a light sensitive polymer material using an ultraviolet laser. Correspondingly, the second optical waveguide is a polymer optical waveguide. Optionally, a thickness of the ultraviolet-sensitive polymer material may be about 3 μm. In the present disclosure, the second optical waveguide may also be prepared using another method, and this embodiment of the present disclosure is not limited thereto.

Figure 10:
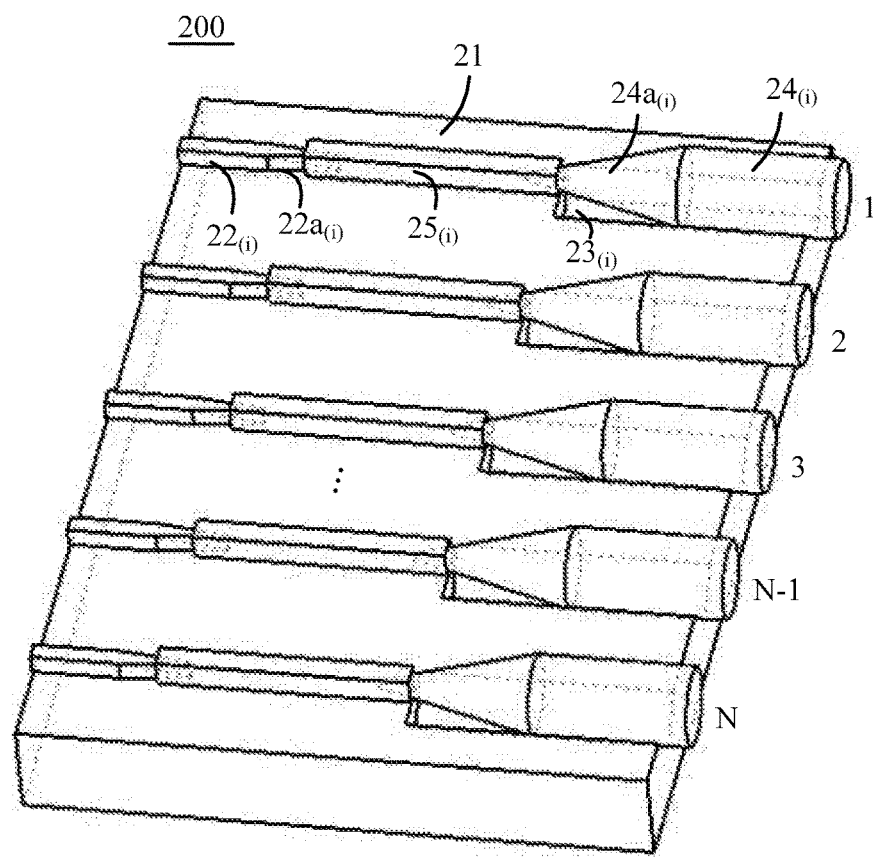
FIG. 10 is still another schematic three-dimensional view of coupling an optical waveguide to a single-mode fiber using a method for coupling an optical waveguide to a single-mode fiber according to an embodiment of the present disclosure.

Optionally, quantities of locating slots, first optical waveguides, second optical waveguides, and single-mode fibers are the same and may be one or more. When there are multiple first optical waveguides and multiple single-mode fibers, the method for coupling an optical waveguide to a single-mode fiber in this embodiment of the present disclosure can implement coupling between a single-mode fiber array and an integrated optical waveguide array. Furthermore, as shown in FIG. 10, an apparatus 200 for coupling an optical waveguide to a single-mode fiber, assuming that a quantity of first optical waveguides included in a first optical waveguide array and a quantity of single-mode fibers included in a single-mode fiber array are both N, and N is an integer greater than 1, where one end of each first optical waveguide in the first optical waveguide array is processed to have an inverted taper structure whose width is gradually decreased, and one end of each single-mode fiber in the single-mode fiber array is processed to have an optical fiber taper structure whose diameter is gradually decreased, the method for coupling an optical waveguide to a single-mode fiber that is provided by this embodiment of the present disclosure includes the following steps.

(1) Dispose N locating slots 23 at locations corresponding to the first optical waveguide array on the substrate 21 such that a center line of the $i^{th}$ locating slot $23_{(i)}$ of the N locating slots 23 is parallel to a taper tip of an inverted taper structure $22a_{(i)}$ of the $i^{th}$ first optical waveguide $22_{(i)}$ included in the first optical waveguide array, where i=1, ..., N. The N locating slots 23 and the first optical waveguide array are respectively located at two sides on the upper surface of the substrate 21. Preferably, the center line of the $i^{th}$ locating slot $23_{(i)}$ is basically aligned with the taper tip of the inverted taper structure $22a_{(i)}$ of the $i^{th}$ first optical waveguide $22_{(i)}$, and the $i^{th}$ locating slot $23_{(i)}$ may be a U-shaped slot, a V-shaped slot, or a rectangular slot.

(2) Horizontally fasten, into the N locating slot 23, the N single-mode fibers included in the single-mode fiber array respectively such that the $i^{th}$ single-mode fiber $24_{(i)}$ of the single-mode fiber array extends out of the $i^{th}$ locating slot $23_{(i)}$ along a direction of the $i^{th}$ first optical waveguide $22_{(i)}$.

Furthermore, the $i^{th}$ single-mode fiber $24_{(i)}$ of the N single-mode fibers is fastened into the $i^{th}$ locating slot $23_{(i)}$, and one end, having an optical fiber taper structure $24a_{(i)}$, of the $i^{th}$ single-mode fiber $24_{(i)}$ is disposed near the $i^{th}$ first optical waveguide $22_{(i)}$, and a terminal of the end, having the optical fiber taper structure $24a_{(i)}$, of the $i^{th}$ single-mode fiber $24_{(i)}$ is higher than the upper surface of the substrate 21, but this embodiment of the present disclosure is not limited thereto.

(3) Dispose N second optical waveguides 25 such that the $i^{th}$ second optical waveguide $25_{(i)}$ of the N second optical waveguides 25 is optically coupled to the $i^{th}$ first optical waveguide $22_{(i)}$ and the $i^{th}$ single-mode fiber $24_{(i)}$.

Both a terminal of the $i^{th}$ first optical waveguide $22_{(i)}$ and the terminal of the $i^{th}$ single-mode fiber $24_{(i)}$ may be embedded in the $i^{th}$ second optical waveguide $25_{(i)}$, or a terminal of the $i^{th}$ first optical waveguide $22_{(i)}$ is embedded in the $i^{th}$ second optical waveguide $25_{(i)}$ and the terminal of the $i^{th}$ single-mode fiber $24_{(i)}$ is optically coupled to the $i^{th}$ second optical waveguide $25_{(i)}$ using an evanescent field, but this embodiment of the present disclosure is not limited thereto.

Therefore, according to the method for coupling an optical waveguide to a single-mode fiber in this embodiment of the present disclosure, one end of a first optical waveguide is set to have an inverted taper structure, to enlarge a spot size of the first optical waveguide, one end of a single-mode fiber is set to have an optical fiber taper structure, to diminish a spot size of the single-mode fiber, and a second optical waveguide is disposed according to locations of the first optical waveguide and the single-mode fiber in order to implement alignment and coupling between the first optical waveguide and the single-mode fiber using the second optical waveguide. The first optical waveguide and the single-mode fiber do not need to be precisely aligned, as long as center lines of the first optical waveguide and the single-mode fiber are parallel, thereby improving an alignment tolerance between the first optical waveguide and the single-mode fiber, lowering an alignment precision requirement on a coupling device and reducing production costs, and increasing a possibility of industrializing an integrated optical waveguide chip.

It should be understood that, the sequence numbers of the foregoing processes do not mean execution sequences, and the execution sequences of the processes shall be determined according to functions and internal logic of the processes, and shall not be construed as any limitation to the implementation processes of the embodiments of the present disclosure.

With reference to FIG. 2 to FIG. 10, the method for coupling an optical waveguide to a single-mode fiber according to the embodiments of the present disclosure is described in detail above. The following describes an apparatus for coupling an optical waveguide to a single-mode fiber according to an embodiment of the present disclosure with reference to FIG. 11.

Figure 11:
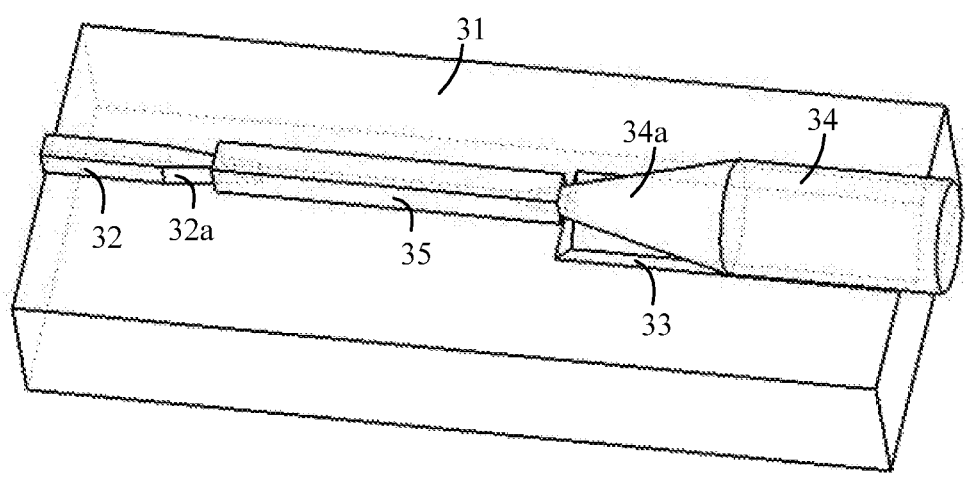
FIG. 11 is a schematic three-dimensional view of an apparatus for coupling an optical waveguide to a single-mode fiber according to an embodiment of the present disclosure.

FIG. 11 is a schematic block diagram of an apparatus 300 for coupling an optical waveguide to a single-mode fiber according to an embodiment of the present disclosure, where the apparatus 300 includes at least one optical waveguide-fiber coupling unit, and a first optical waveguide-fiber coupling unit of the at least one optical waveguide-fiber coupling unit includes a substrate 31, where a locating slot 33 is formed on the substrate 31, a first optical waveguide 32 disposed on the substrate 31, where one end of the first optical waveguide 32 has an inverted taper structure 32a whose width is gradually decreased, and a center line, passing through a taper tip, of the inverted taper structure 32a is parallel to a center line of the locating slot 33, a single-mode fiber 34 disposed in the locating slot 33, where one end of the single-mode fiber 34 has an optical fiber taper structure 34a whose diameter is gradually decreased, and the end, having the optical fiber taper structure 34a, of the single-mode fiber 34 is disposed opposite to the end, having the inverted taper structure 32a, of the first optical waveguide 32, and a second optical waveguide 35 disposed on the substrate 31, where the second optical waveguide 35 is located between the first optical waveguide 32 and the single-mode fiber 34, the second optical waveguide 35 is optically coupled to the first optical waveguide 32 using the end, having the inverted taper structure 32a, of the first optical waveguide 32, and the second optical waveguide 35 is optically coupled to the single-mode fiber 34 using the end, having the optical fiber taper structure 34a, of the single-mode fiber 34.

In this embodiment of the present disclosure, the locating slot 33 and the first optical waveguide 32 are respectively located at two opposite sides on an upper surface of the substrate 31, and the center line, passing through the taper tip, of the inverted taper structure 32a is parallel to the center line of the locating slot 33. A distance between the center line, passing through the taper tip, of the inverted taper structure 32a and the center line of the locating slot 33 may be less than a preset threshold (100 μm), and the preset threshold may depend on processing precision of the locating slot 33 and layouts of the optical waveguide-fiber coupling unit. Preferably, the taper tip of the inverted taper structure 32a may be basically aligned with the center line of the locating slot 33, that is, the center line, passing through the taper tip, of the inverted taper structure 32a may basically coincide with the center line of the locating slot 33 such that the first optical waveguide 32 is basically aligned with the single-mode fiber 34 that is fastened into the locating slot 33, thereby reducing complexity of a path of the second optical waveguide 35 on the substrate, but this embodiment of the present disclosure is not limited thereto.

When multiple optical waveguide-fiber coupling units are included in the apparatus for coupling an optical waveguide to a single-mode fiber, other optical waveguide-fiber coupling units in the apparatus for coupling an optical waveguide to a single-mode fiber than the first optical waveguide-fiber coupling unit may have structures that are the same as a structure of the first optical waveguide-fiber coupling unit. In this case, the apparatus for coupling an optical waveguide to a single-mode fiber implements coupling between an optical waveguide array and a single-mode fiber array. Optionally, the other optical waveguide-fiber coupling units in the apparatus for coupling an optical waveguide to a single-mode fiber may also have structures that are different from the structure of the first optical waveguide-fiber coupling unit, which is not limited in this embodiment of the present disclosure.

Therefore, according to the apparatus for coupling an optical waveguide to a single-mode fiber in this embodiment of the present disclosure, one end of a first optical waveguide is set to have an inverted taper structure, to enlarge a spot size of the first optical waveguide, one end of a single-mode fiber is set to have an optical fiber taper structure, to diminish a spot size of the single-mode fiber, and a second optical waveguide is disposed according to locations of the first optical waveguide and the single-mode fiber in order to implement alignment and coupling between the first optical waveguide and the single-mode fiber using the second optical waveguide. The first optical waveguide and the single-mode fiber do not need to be precisely aligned, as long as center lines of the first optical waveguide and the single-mode fiber are parallel, thereby improving an alignment tolerance between the first optical waveguide and the single-mode fiber, lowering an alignment precision requirement on a coupling device and reducing production costs, and increasing a possibility of industrializing an integrated optical waveguide chip.

In this embodiment of the present disclosure, the first optical waveguide may be any integrated optical waveguide. For example, the first optical waveguide is a silicon waveguide, that is, a silicon-based optical waveguide, and correspondingly, the substrate may be an SOI substrate. The first optical waveguide may also be a polymer optical waveguide, for example, an optical waveguide in an OE-PCB, but this embodiment of the present disclosure is not limited thereto.

One end of the first optical waveguide is set to have the inverted taper structure, where the width of the inverted taper structure is gradually decreased along a direction of the single-mode fiber such that a size of a mode field that is transmitted in the first optical waveguide is gradually enlarged and a light field that is limited to being transmitted in the first optical waveguide gradually separates from a limitation of the first optical waveguide and is transferred to the outside of the first optical waveguide. Optionally, to effectively enlarge a spot size of the first optical waveguide, a width of the taper tip of the inverted taper structure is less than 100 nm, and a length of a taper area of the inverted taper structure has an order of hundreds of micrometers.

A slope of the inverted taper structure may be set according to an actual requirement. Generally, a smaller slope indicates a larger length of the inverted taper structure. Preferably, the inverted taper structure can meet an adiabatic transition condition such that the first optical waveguide has a smallest structural loss, but this embodiment of the present disclosure is not limited thereto.

One end of the single-mode fiber has the optical fiber taper structure, where the diameter of the optical fiber taper structure is gradually decreased along a direction of the first optical waveguide such that a spot size of the single-mode fiber is decreased. Generally, the spot size of the single-mode fiber may be decreased from 10 μm to an order of a submicrometer using the optical fiber taper structure. Optionally, a diameter of a taper tip of the optical fiber taper structure of the single-mode fiber is less than 3 μm, but this embodiment of the present disclosure is not limited thereto.

The apparatus for coupling an optical waveguide to a single-mode fiber in the present disclosure implements coupling and alignment between the first optical waveguide and the single-mode fiber mainly using the second optical waveguide. Therefore, the locating slot may have multiple different shapes. Optionally, the locating slot may be a U-shaped slot, a V-shaped slot, or a rectangular slot. A section size of the locating slot is set such that a terminal of the end, having the optical fiber taper structure, of the single-mode fiber is higher than an upper surface of the substrate, where a distance between the terminal and the upper surface may be 1 μm to 5 μm. Preferably, a height between the terminal of the end, having the optical fiber taper structure, of the single-mode fiber and the upper surface of the substrate may be a half of a height of the second optical waveguide, but this embodiment of the present disclosure is not limited thereto.

Optionally, the single-mode fiber is horizontally fastened into the locating slot, and the end, having the optical fiber taper structure, of the single-mode fiber may extend out of the locating slot along the direction of the first optical waveguide. Optionally, the single-mode fiber may be fastened and packaged in the locating slot using an ultraviolet curing adhesive, a length by which the end, having the optical fiber taper structure, of the single-mode fiber extends out of the locating slot may be dozens of micrometers, and the terminal of the end, having the optical fiber taper structure, of the single-mode fiber may be basically aligned with a terminal of the end, having the inverted taper structure, of the first optical waveguide, but this embodiment of the present disclosure is not limited thereto.

The second optical waveguide may be optically coupled to the first optical waveguide and the single-mode fiber in different manners. Optionally, the end, having the inverted taper structure, of the first optical waveguide and the end, having the optical fiber taper structure, of the single-mode fiber may be both embedded in the second optical waveguide. Further, both the end, having the inverted taper structure, of the first optical waveguide and the end, having the optical fiber taper structure, of the single-mode fiber may be embedded near a central axis of the second optical waveguide in order to implement optical coupling between the second optical waveguide and the first optical waveguide, and between the second optical waveguide and the single-mode fiber. Optionally, in another embodiment, the end, having the inverted taper structure, of the first optical waveguide is embedded in the second optical waveguide, and the end, having the optical fiber taper structure, of the single-mode fiber is optically coupled to the second optical waveguide using an evanescent field. Furthermore, the end, having the optical fiber taper structure, of the single-mode fiber may be close to the second optical waveguide within a particular distance, for example, within about 100 nm, and a side face of the terminal of the end, having the optical fiber taper structure, of the single-mode fiber may also be partially overlapped with the second optical waveguide, that is, a part of the end, having the optical fiber taper structure, of the single-mode fiber is embedded in the second optical waveguide, but this embodiment of the present disclosure is not limited thereto.

The path of the second optical waveguide on the substrate is set by depending on the location of the first optical waveguide, the location of the single-mode fiber, and a manner of coupling between the second optical waveguide and the first optical waveguide and coupling between the second optical waveguide and the single-mode fiber. Optionally, to determine the path of the second optical waveguide more precisely, accurate locations of the terminals of the first optical waveguide and the single-mode fiber may also be determined using a machine visual aid system, and the path of the second optical waveguide is calculated according to the location of the first optical waveguide, the location of the single-mode fiber, and a mathematical calculation method. Furthermore, according to the set path of the second optical waveguide, the second optical waveguide needs to be optically coupled to the first optical waveguide and the single-mode fiber, and the second optical waveguide also needs to have a relatively small loss, that is, have a relatively small transmission loss and bending loss. The path of the second optical waveguide may have a relatively small path length and have no obvious bending in order to reduce the transmission loss and the bending loss. Preferably, the path of the second optical waveguide on the substrate is a path with a smallest loss among all possible paths determined according to the location of the terminal of the end, having the inverted taper structure, of the first optical waveguide and the location of the terminal of the end, having the optical fiber taper structure, of the single-mode fiber, that is, a path of which the sum of a transmission loss and a bending loss is the smallest among all the possible paths, but this embodiment of the present disclosure is not limited thereto.

After the path of the second optical waveguide is determined, the second optical waveguide may be prepared along the determined path in multiple manners. Optionally, the second optical waveguide may be prepared using an ultraviolet laser direct writing method. Correspondingly, the second optical waveguide is obtained by performing direct writing, along the path with a smallest loss using an ultraviolet laser, on an ultraviolet-sensitive polymer material spin-coated on the substrate.

Further, a layer of ultraviolet-sensitive polymer material may be spin-coated on the substrate first, where a thickness of the ultraviolet-sensitive polymer material may be about 3 µm, and then direct writing is performed on the ultraviolet-sensitive polymer material along the determined path of the second optical waveguide using the ultraviolet laser to obtain the second optical waveguide, but this embodiment of the present disclosure is not limited thereto.

The apparatus 300 for coupling an optical waveguide to a single-mode fiber according to this embodiment of the present disclosure may be coupled and packaged using the method for coupling an optical waveguide to a single-mode fiber shown in FIG. 2 to FIG. 10. Correspondingly, for a structure of the apparatus 300 for coupling an optical waveguide to a single-mode fiber, reference may be made to FIG. 2 to FIG. 10 and corresponding descriptions, and details are not described herein again for brevity.

Therefore, according to the apparatus for coupling an optical waveguide to a single-mode fiber in this embodiment of the present disclosure, one end of a first optical waveguide is set to have an inverted taper structure, to enlarge a spot size of the first optical waveguide, one end of a single-mode fiber is set to have an optical fiber taper structure, to diminish a spot size of the single-mode fiber, and a second optical waveguide is disposed according to locations of the first optical waveguide and the single-mode fiber in order to implement alignment and coupling between the first optical waveguide and the single-mode fiber using the second optical waveguide. The first optical waveguide and the single-mode fiber do not need to be precisely aligned, as long as center lines of the first optical waveguide and the single-mode fiber are parallel, thereby improving an alignment tolerance between the first optical waveguide and the single-mode fiber, lowering an alignment precision requirement on a coupling device and reducing production costs, and increasing a possibility of industrializing an integrated optical waveguide chip.

It should be understood that, the term "and/or" in this embodiment of the present disclosure describes only an association relationship for describing associated objects and represents that three relationships may exist. For example, A and/or B may represent the following three cases Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided by this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure.

What is claimed is:

1. An apparatus comprising:
a substrate;
a first optical waveguide disposed on the substrate;
a single-mode fiber disposed on the substrate, wherein one end of the single-mode fiber has an optical fiber taper structure whose diameter is gradually decreased toward a tip of the optical fiber taper structure; and
a second optical waveguide disposed on the substrate,
wherein one end of the second optical waveguide is optically coupled to the first optical waveguide,
wherein another end of the second optical waveguide is optically coupled to the single-mode fiber using the optical fiber taper structure of the single-mode fiber, and
wherein a portion of the optical fiber taper structure is embedded in the second optical waveguide.

2. The apparatus of claim 1, wherein a path of the second optical waveguide on the substrate is a path with a smallest loss among all possible paths determined according to a location of a terminal of the one end of the first optical waveguide and a location of the optical fiber taper structure of the single-mode fiber.

3. The apparatus of claim 2, wherein the second optical waveguide is obtained by performing direct writing, along the path with the smallest loss using an ultraviolet laser, on an ultraviolet-sensitive polymer material spin-coated on the substrate.

4. The apparatus of claim 1, wherein the single-mode fiber is disposed in a locating slot formed on the substrate, and wherein the locating slot is a U-shaped slot.

5. The apparatus of claim 4, wherein a terminal of the optical fiber taper structure of the single-mode fiber is higher than an upper surface of the substrate when the single-mode fiber is horizontally fastened into the locating slot.

6. The apparatus of claim 1, wherein the single-mode fiber is disposed in a locating slot formed on the substrate, and wherein the locating slot is a V-shaped slot.

7. The apparatus of claim 1, wherein the single-mode fiber is disposed in a locating slot formed on the substrate, and wherein the locating slot is a rectangular slot.

8. The apparatus of claim 1, wherein a diameter of a taper tip of the optical fiber taper structure is less than 3 micro meter ($\mu$m).

9. An apparatus comprising:
a substrate;
a first optical waveguide disposed on the substrate;
a single-mode fiber disposed on the substrate, wherein one end of the single-mode fiber has an optical fiber taper structure whose diameter is gradually decreased toward a tip of the optical fiber taper structure; and
a second optical waveguide disposed on the substrate,
wherein one end of the second optical waveguide is optically coupled to the first optical waveguide,
wherein another end of the second optical waveguide is optically coupled to the single-mode fiber using the optical fiber taper structure of the single-mode fiber,
wherein a portion of the first optical waveguide is embedded in the second optical waveguide, and
wherein the optical fiber taper structure of the single-mode fiber is optically coupled to the second optical waveguide using an evanescent field.

10. A method comprising:
disposing a first optical waveguide on a substrate;
fastening a single-mode fiber on the substrate, wherein one end of the single-mode fiber is an optical fiber taper structure whose diameter is gradually decreased toward a tip of the optical fiber taper structure; and
disposing a second optical waveguide on the substrate,
wherein one end of the second optical waveguide is optically coupled to the first optical waveguide,
wherein another end of the second optical waveguide is optically coupled to the single-mode fiber using the optical fiber taper structure of the single-mode fiber, and
wherein a portion of the optical fiber taper structure is embedded in the second optical waveguide.

11. The method of claim 10, wherein disposing the second optical waveguide on the substrate comprises:
determining a path of the second optical waveguide on the substrate according to a location of the optical fiber taper structure of the single-mode fiber and a location of a terminal of one end of the first optical waveguide; and
disposing the second optical waveguide on the substrate according to the path of the second optical waveguide on the substrate.

12. The method of claim 11, wherein the path of the second optical waveguide on the substrate is a path with a smallest loss among all possible paths determined according to a location of the one end of the first optical waveguide and the location of the optical fiber taper structure of the single-mode fiber.

13. The method of claim 11, wherein disposing the second optical waveguide on the substrate comprises:

spin-coating a layer of ultraviolet-sensitive polymer material on the substrate; and performing direct writing on the ultraviolet-sensitive polymer material along the path of the second optical waveguide on the substrate using an ultraviolet laser to form the second optical waveguide.

14. The method of claim 10, wherein the single-mode fiber is fastened into a locating slot formed on the substrate, and wherein the locating slot is a U-shaped slot, a V-shaped slot, or a rectangular slot.

15. The method of claim 14, wherein a terminal of the optical fiber taper structure of the single-mode fiber is higher than an upper surface of the substrate when the single-mode fiber is horizontally fastened into the locating slot.

16. The method of claim 10, wherein a diameter of a taper tip of the optical fiber taper structure is less than 3 micrometer (μm).

17. A method comprising:

disposing a first optical waveguide on a substrate;

fastening a single-mode fiber on the substrate, wherein one end of the single-mode fiber is an optical fiber taper structure whose diameter is gradually decreased toward a tip of the optical fiber taper structure; and disposing a second optical waveguide on the substrate, wherein one end of the second optical waveguide is optically coupled to the first optical waveguide, wherein another end of the second optical waveguide is optically coupled to the single-mode fiber using the optical fiber taper structure of the single-mode fiber, wherein a portion of the first optical waveguide is embedded in the second optical waveguide, and wherein the optical fiber taper structure of the single-mode fiber is optically coupled to the second optical waveguide using an evanescent field.

* * * * *